United States Patent [19]
Arimilli et al.

[11] Patent Number: 5,796,979
[45] Date of Patent: Aug. 18, 1998

[54] DATA PROCESSING SYSTEM HAVING DEMAND BASED WRITE THROUGH CACHE WITH ENFORCED ORDERING

[75] Inventors: Ravi Kumar Arimilli, Round Rock; John Steven Dodson, Pflugerville; Guy Lynn Guthrie, Austin; Jerry Don Lewis, Round Rock, all of Tex.

[73] Assignee: International Business Machines Corporation, Armonk, N.Y.

[21] Appl. No.: 730,994

[22] Filed: Oct. 16, 1996

Related U.S. Application Data

[63] Continuation of Ser. No. 316,979, Oct. 3, 1994, abandoned.
[51] Int. Cl.$^6$ ............................................. G06F 12/08
[52] U.S. Cl. ................................... 395/469; 395/460
[58] Field of Search ................................ 395/468, 469, 395/471, 460

[56] References Cited

U.S. PATENT DOCUMENTS

| | | | |
|---|---|---|---|
| 3,812,475 | 5/1974 | Christiansen et al. | 395/800 |
| 3,967,247 | 6/1976 | Andersen et al. | 395/250 |
| 4,394,733 | 7/1983 | Swenson | 395/403 |
| 4,713,755 | 12/1987 | Worley et al. | 395/375 |

FOREIGN PATENT DOCUMENTS

WO 90/03002  8/1989  WIPO.
WO 94/08296  4/1994  WIPO.

Primary Examiner—David Y. Eng
Attorney, Agent, or Firm—Raymond M. Galasso; Jenkens & Gilchrist; Anthony V. S. England

[57] ABSTRACT

A data processing system includes a processor, a system memory, one or more input/output channel controllers (IOCC), and a system bus connecting the processor, the memory and the IOCCs together for communicating instructions, address and data between the various elements of a system. The IOCC includes a paged cache storage having a number of lines wherein each line of the page may be, for example, 32 bytes. Each page in the cache also has several attribute bits for that page including the so called WIM and attribute bits. The W bit is for controlling write through operations; the I bit controls cache inhibit; and the M bit controls memory coherency. Since the IOCC is unaware of these page table attribute bits for the cache lines being DMAed to system memory, IOCC must maintain memory consistency and cache coherency without sacrificing performance. For DMA write data to system memory, new cache attributes called global, cachable and demand based write through are created. Individual writes within a cache line are gathered by the IOCC and only written to system memory when the I/O bus master accesses a different cache line or relinquishes the I/O bus.

3 Claims, 3 Drawing Sheets

5,796,979

DATA PROCESSING SYSTEM HAVING DEMAND BASED WRITE THROUGH CACHE WITH ENFORCED ORDERING

This application is a continuation of application Ser. No. 08,316,979, filed on Oct. 3, 1994, which was abandoned upon the filing hereof.

CROSS REFERENCE TO RELATED APPLICATIONS

This application for patent is related to the following applications for patent filed concurrently herewith:

EFFICIENT ADDRESS TRANSFER TECHNIQUE FOR A DATA PROCESSING SYSTEM, Ser. No. 08/317,007;

DUAL LATENCY STATUS AND COHERENCY REPORTING FOR A MULTIPROCESSING SYSTEM, Ser. No. 08/316,980 now U.S. Pat. No. 5,608,878;

SYSTEM AND METHOD FOR DETERMINING SOURCE OF DATA IN A SYSTEM WITH INTERVENING CACHES, Ser. No. 08/317,256;

QUEUED ARBITRATION MECHANISM FOR DATA PROCESSING SYSTEM, Ser. No. 08/317,006;

METHOD AND APPARATUS FOR REMOTE RETRY IN A DATA PROCESSING SYSTEM, Ser. No. 08/316,978 now U.S. Pat. No. 5,623,694;

ARRAY CLOCKING METHOD AND APPARATUS FOR INPUT/OUTPUT SUBSYSTEMS, Ser. No. 08/316,976 now U.S. Pat. No. 5,548,797;

COHERENCY AND SYNCHRONIZATION MECHANISMS FOR I/O CHANNEL CONTROLLERS IN A DATA PROCESSING SYSTEM, Ser. No. 08/316,977 now U.S. Pat. No. 5,613,153;

ALTERNATING DATA VALID CONTROL SIGNALS FOR HIGH PERFORMANCE DATA TRANSFER, Ser. No. 08/326,190;

LOW LATENCY ERROR REPORTING FOR HIGH PERFORMANCE BUS, Ser. No. 08/326,203.

Each of such cross-referenced applications are hereby incorporated by reference into this Application as though fully set forth herein.

BACKGROUND OF THE INVENTION

1. Field of the Invention

The present invention relates to data processing systems, and more particularly to data processing systems having one or more processors, a system storage, a system bus and one or more input/output channel controllers ("IOCC") and allowing direct memory access (DMA) from I/O channel controllers to system memory.

2. Prior Art

Direct memory access (DMA) is almost as old as the computer industry. It was first developed by Carl Christiansen, et al. for the IBM 705 computer system in 1956. The Christiansen, et al. U.S. Pat. No. 3,812,475 showed the basic DMA techniques employed in a Von Neumann computer architecture system.

DMA techniques for systems including caches and write through caches are generally well-known in the art. A typical write through cache forwards each cache modification with an appropriate system memory modification. Thus, when multiple cache modifications occur, an equivalent multiple of system memory write operations occur.

Write through caches are typically used in computer systems to reduce cache controller complexity and minimize cache and memory data inconsistencies. Processors, IOCCs and I/O devices commonly use traditional write through caches in order to obtain these benefits.

SUMMARY OF THE INVENTION

It is an object of the present invention to improve system performance by employing a demand based write through cache technique in which data to be written through the cache to system memory is gathered at the cache and written to system memory by a block write based upon predetermined demand criteria.

It is another object of the present invention to enforce "byte level write ordering" during DMA writes to system memory.

Therefore, a data processing system includes a processor, a system memory, one or more input/output channel controllers (IOCC), and a system bus connecting the processor, the memory and the IOCCs together for communicating instructions, address and data between the various elements of a system. The IOCC includes a paged cache storage having a number of lines wherein each line of the page may be, for example, 32 bytes. Each page in the cache also has several attribute bits for that page including the so called WIM and attribute bits. The W bit is for controlling write through operations; the I bit controls cache inhibit; and the M bit controls memory coherency. Since the IOCC is unaware of these page table attribute bits for the cache lines being DMAed to system memory, IOCC must maintain memory consistency and cache coherency without sacrificing performance. For DMA write data to system memory, new cache attributes called global, cachable and demand based write through are created. Individual writes within a cache line are gathered by the IOCC and only written to system memory when the I/O bus master accesses a different cache line or relinquishes the I/O bus.

It is an advantage of the present invention that the method and apparatus according to the present invention provides high performance write through caches by gathering write data and performing block writes to system memory based on predetermined demand criteria.

It is another feature of the present invention that the demand based write through caching technique could be advantageously employed in write through caches associated with system processors, and other I/O devices.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

With the foregoing hardware in mind, it is possible to explain the process-related features of the present invention.

To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Figure 1:
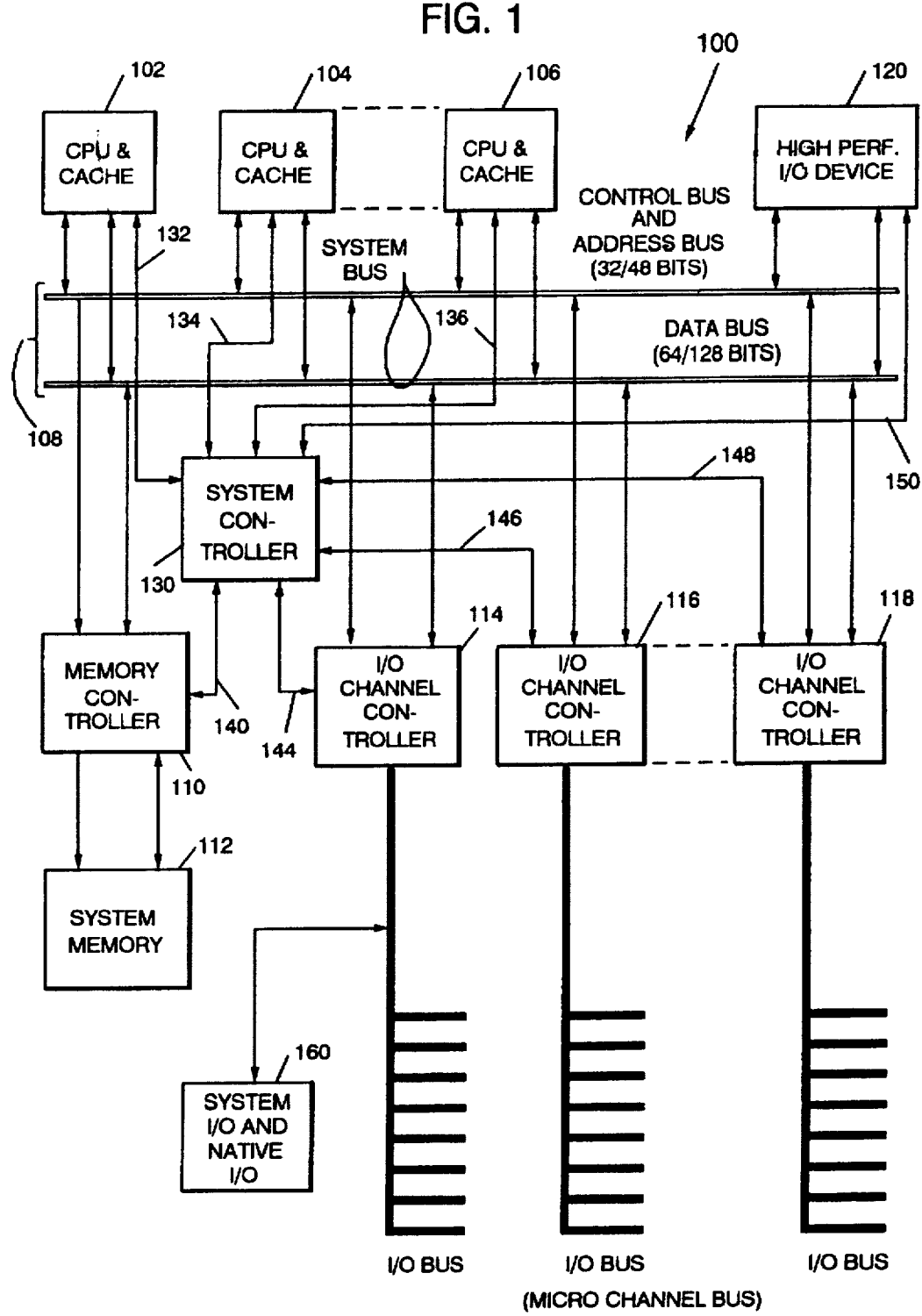
FIG. 1 is a system block diagram of a data processing system embodying the present invention.

Referring now to FIG. 1, a data processing system which advantageously embodies the present invention will be described. Multiprocessor system 100 includes a number of processing units 102, 104, 106 operatively connected to a system bus 108. Also connected to the system bus 108 is a memory controller 110, which controls access to system memory 112, and I/O channel controllers 114, 116, and 118. Additionally, a high performance I/O device 120 may be connected to the system bus 108. Each of the system elements described 102–120, inclusive, operate under the control of system controller 130 which communicates with each unit connected to the system bus 108 by point to point lines such as 132 to processor 102, 134 to processor 104, 136 to processor 106, 140 to memory controller 110, 144 to I/O channel controller 114, 146 to I/O channel controller 116, 148 to I/O channel controller 118, and 150 to high performance I/O device 120. Requests and grants of bus access are all controlled by system controller 130.

I/O channel controller 114 controls and is connected to system I/O subsystem and native I/O subsystem 160.

Each processor unit 102, 104, 106 may include a processor and a cache storage device.

Figure 2:
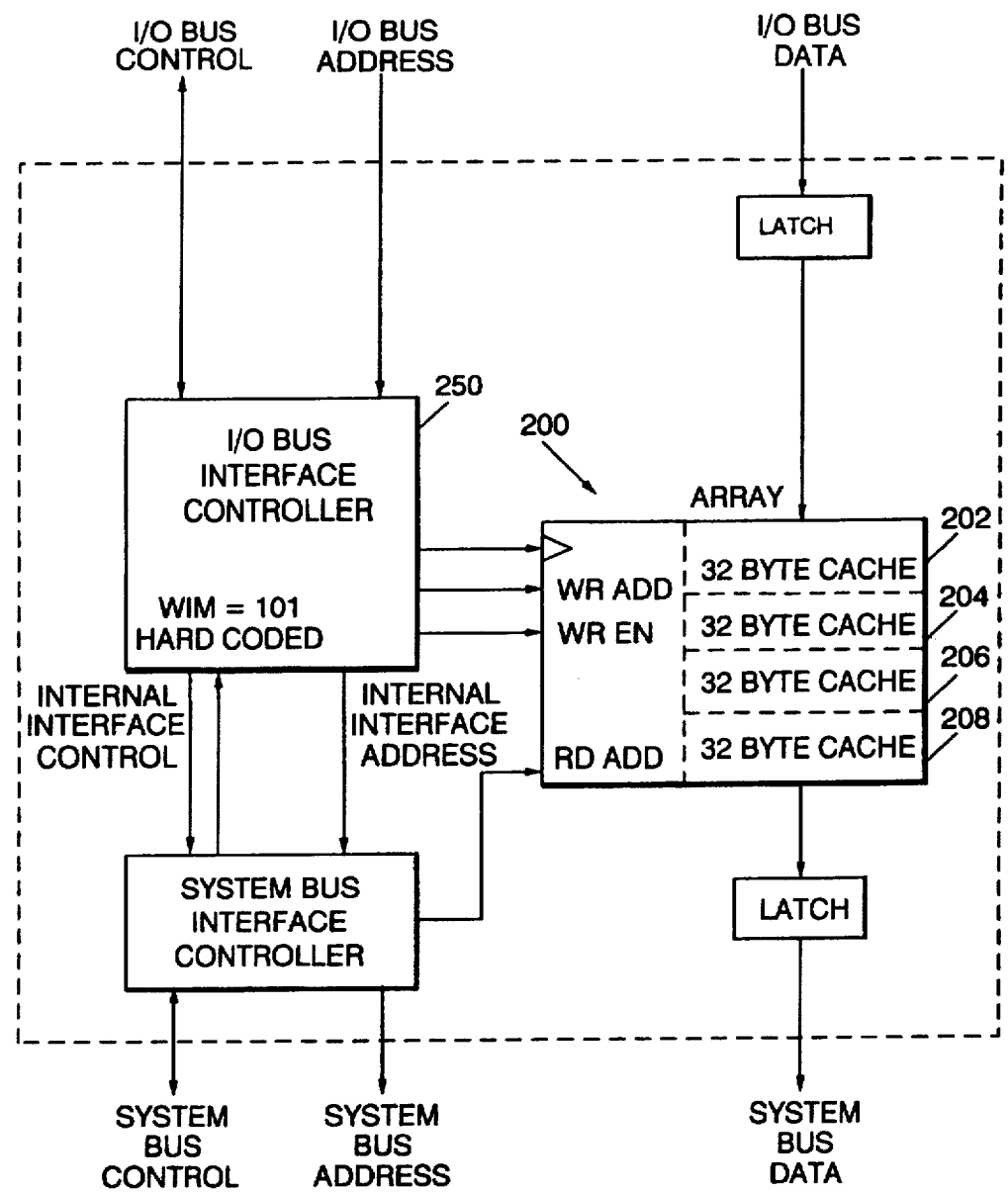
FIG. 2 is a block diagram of a demand based write through cache in accordance with the present invention.

Referring now to FIG. 2, the operation of the write through cache in accordance with the present invention will be described. Cache 200 is organized as a 128 byte circular cache having two 64-byte cache lines wherein the cache is divided into four 32-byte sectors 202, 204, 206 and 208. From the system bus, this cache structure allows the IOCC, for example, IOCC 114 (see FIG. 1) to efficiently support systems with either 32-byte or 64-byte coherency requirements. Due to the coherency requirements of the system bus, there are many cases in which DMA write data by the IOCC is retried on the system bus for lengthy periods of time. The DMA write cache organization according to the present invention provides a relatively efficient means of isolating system bus traffic from I/O bus transfers, thus improving I/O bus throughput and bandwidth. By organizing cache 200 as four 32-byte sectors, coupled with the circular structure of cache 200, IOCC 114 performs heavy pipelining of sequential write data thus allowing the I/O bus devices to sustain a high data rate via the I/O bus interface controller 250.

The WIM attribute bits associated with system memory pages are shown in the following table with the meaning of each combination of WIM bits.

| W | I | M | Attribute Description |
|---|---|---|---|
| X | 1 | 0 | Non-global, non-cachable |
| X | 1 | 1 | Global, non-cachable |
| 0 | 0 | 0 | Non-global, cachable, write back |
| 1 | 0 | 0 | Non-global, cachable, write through |
| 0 | 0 | 1 | Global, cachable, write back |

-continued

| W | I | M | Attribute Description |
|---|---|---|---|
| 1 | 0 | 1 | Global, cachable, write through |

These WIM bits are managed by the operating system software and are accessed by processor 102, etc. (and I/O devices) to determine the cache attributes associated with each system memory page. Unlike processor 102, most IOCCs 114, etc. and I/O devices are unaware of the value of the WIM attribute bits. Thus, during I/O DMA write operations to system memory 112, IOCC 114 must support the 101 code in order to avoid I/O cache and memory data inconsistencies. This then allows IOCC 114 to extend the 101 code and support a demand based write through cache. In some systems, IOCC 114 is aware of the WIM attribute bits and supports demand based write through cache if the WIM bits equal the 101 code.

Figure 3:
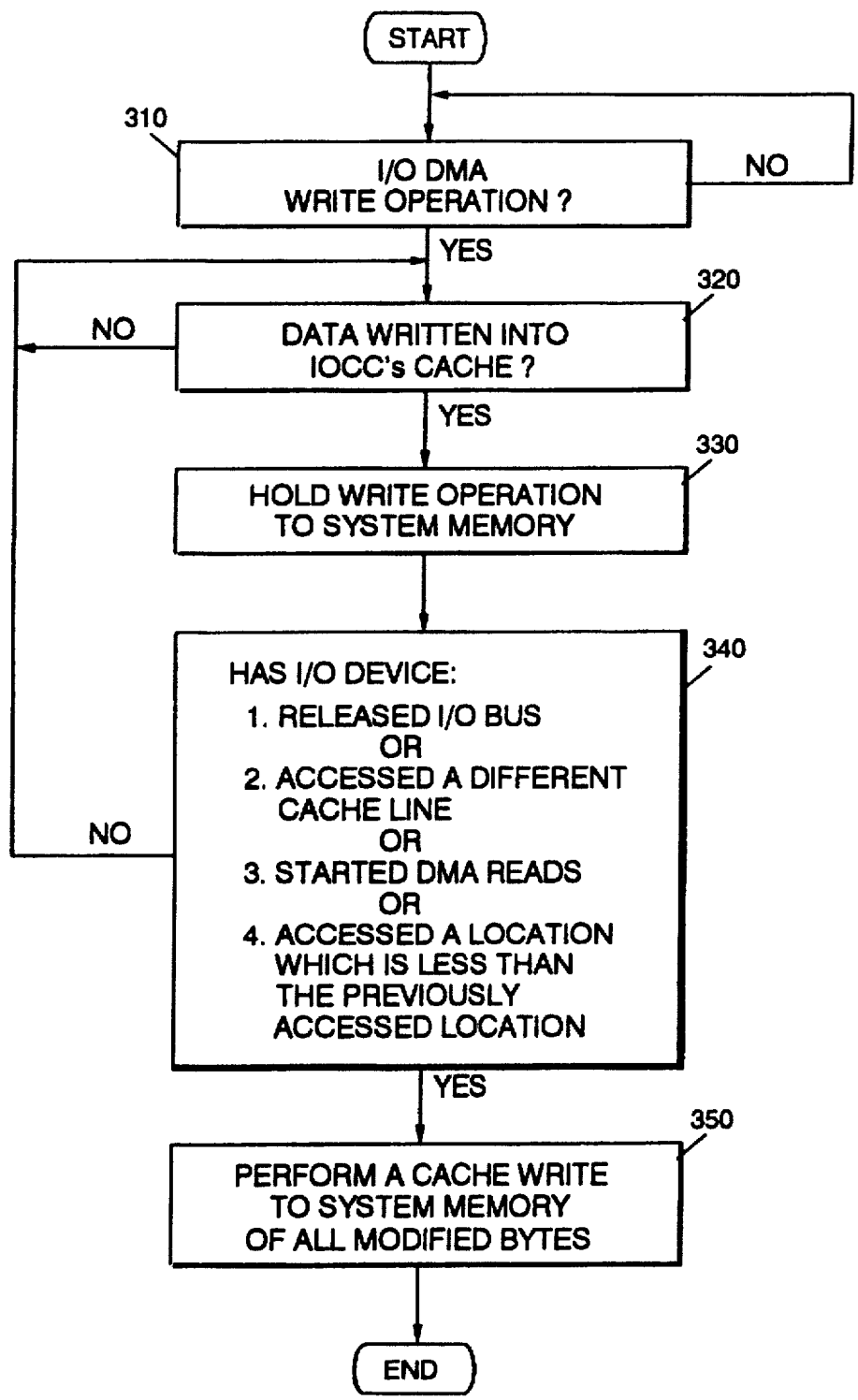
FIG. 3 is a flow chart describing the operation of the demand based write through cache technique in accordance with the present invention.

Referring now to FIG. 3, the operation of the demand based write through cache will be described. If a demand based write through cache operation is to be performed, the WIM bits will be "101".

After the operation is started, the process tests for an I/O DMA write operation step 310. The process loops until the write operation is received. The process then proceeds to write the data in the IOCC cache at step 320. The process loops until all data is written into the IOCC cache (step 320) at which time the process then moves to step 330, which is the hold write operation to system step. The hold write operation to system memory at 330 is employed to cause the process to wait until one of several events occurs and then allow a block write of the held modified data to system memory. Test is made at step 340 to determine whether the I/O device has:

(1) released the I/O bus; or
(2) accessed a different cache line; or
(3) started a DMA read operation; or
(4) accessed a location having an address less than the address of the previously accessed location.

If none of these events have occurred, the process loops back to step 320 to allow additional data to be written into the cache of the IOCC (i.e., 114). If any of the events set forth in step 340 have occurred, a block write of modified data to system memory 112 is then performed at step 350.

It should be recognized that although the preferred embodiment of the present invention has been described with respect to a demand based write through cache operation in which data is written in to cache and then at appropriate times written through to system memory, the present invention applies equally to load operations in which data is being read from system memory through cache. The specific details of the operation of a demand based read through cache operation are easily implemented by those skilled in the art without further invention.

Another feature of the present invention relates to maintaining write ordering to system memory. In prior art systems, coherency mechanisms such as cache level snooping, retry and push protocols have been used to maintain write ordering between cache and system memory. (Snooping, retry, and push protocols are well known in the art).

However, the apparatus and method according to the present invention having a demand based write through cache can significantly improve system performance and reduce design complexity by providing a byte level write ordering rather than cache level snooping, retry or push.

Byte level ordering is achieved in a demand based write through cache by adding another condition to the demand criteria. This condition checks to determine if the I/O bus master ever writes "backwards" within the same cache line. That is, if address B is less than address A in the same line, then the write operation for B is held off until the demand based write through cache data is forwarded to system memory. Thus, I/O cache coherency and write data ordering are achieved without the IOCC ever having to snoop, retry or push the DMA write data.

Although the present invention and its advantages have been described in detail, it should be understood that various changes, substitutions and alterations can be made herein without departing from the spirit and scope of the invention as defined by the appended claims.

What is claimed is:

1. A data processing system, comprising:

one or more processing units;

a system memory;

one or more input/output channel controllers operably associated with one or more I/O devices wherein each said input/output channel controller includes an I/O bus;

a system bus connecting said processing units, said memory and said I/O channel controllers;

a system controller for controlling operation of said processing units, said memory and said input/output channel controllers; and wherein each of said input/output channel controllers further comprises a write through cache storage for storing lines of data from said system memory or said processing units for use by said processing units, said write through cache storage including means for performing a demand based write through operation of said cache wherein additional data is stored in said cache until one of a plurality of predetermined conditions cause writing of data from said cache to said system memory to thereby insure coherency between data stored in said cache and said system memory; and wherein said input/output channel controller further comprises means for determining whether an address for access to a portion of a line of data in said write through cache is in an immediate sequence with a previous address and means for inhibiting writing of data to a non-sequential address in said write through cache until data stored in said write through cache is written to said system memory using said demand based write through operation.

2. A data processing system, according to claim 1, wherein said write through cache storage comprises a plurality of attribute bits associated with each line stored in said cache, said attribute bits comprising a first bit indicating whether said line is a write through line; a second bit for indicating whether to inhibit cache operations; and a third bit for indicating a requirement for memory coherency.

3. A data processing system, according to claim 1, wherein said demand based write through operation causes writing of data from said cache to said system memory when one of said I/O devices:

1) releases said I/O bus, or 2) accesses a different line of data in said cache, or 3) starts a DMA read operation, or 4) accesses a memory location having an address less than the address of the previously accessed location.

* * * * *